F. FOSTER.
POWER TRANSMISSION ATTACHMENT FOR AUTOMOBILES.
APPLICATION FILED APR. 28, 1919.
1,355,759.
Patented Oct. 12, 1920.
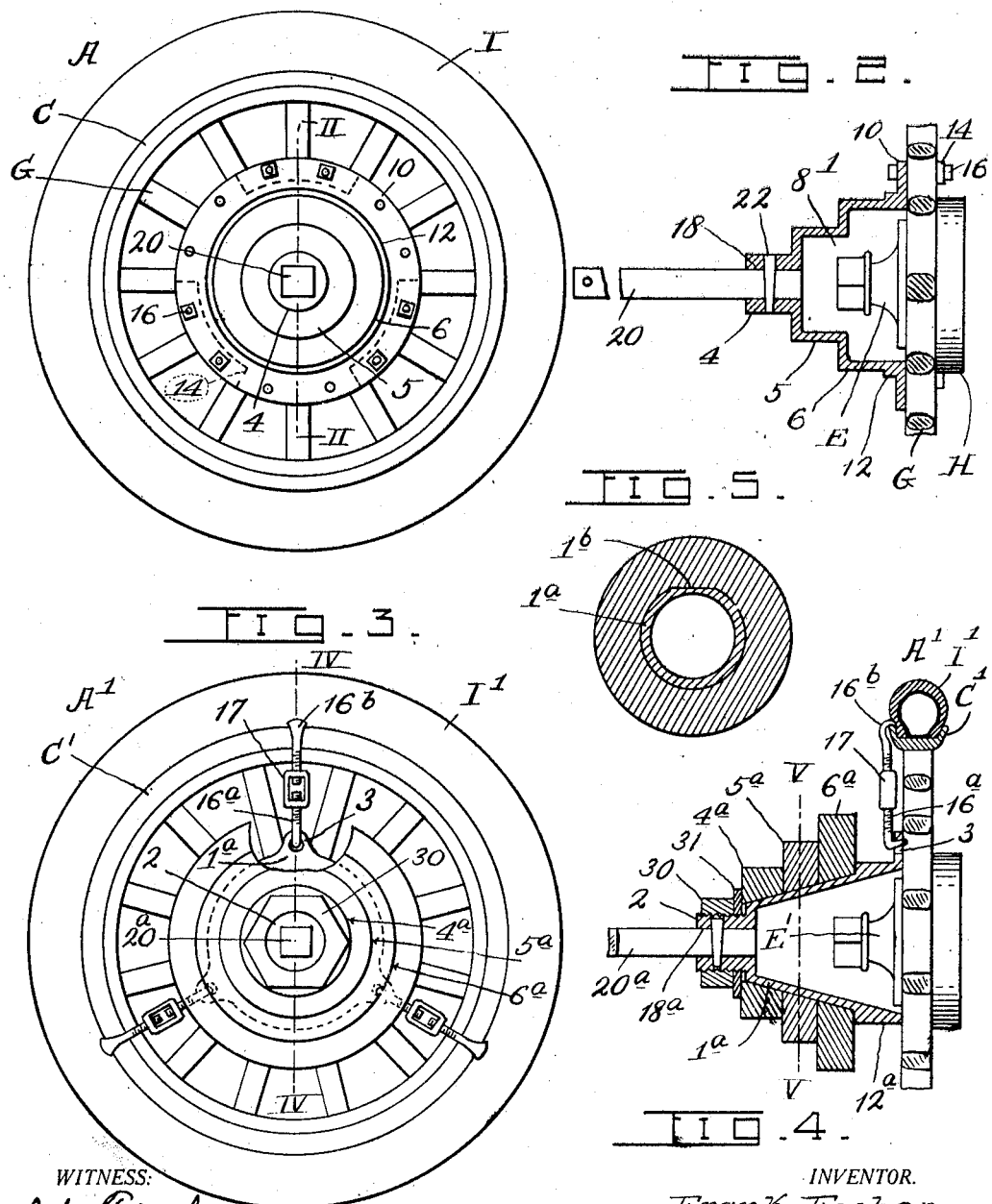
WITNESS:
L. J. Fischer
INVENTOR.
Frank Foster,
BY
F. G. Fischer,
ATTORNEY.

UNITED STATES PATENT OFFICE.

FRANK FOSTER, OF KANSAS CITY, MISSOURI.

POWER-TRANSMISSION ATTACHMENT FOR AUTOMOBILES.

1,355,759.  Specification of Letters Patent.  Patented Oct. 12, 1920.

Application filed April 28, 1919. Serial No. 293,264.

*To all whom it may concern:*

Be it known that I, FRANK FOSTER, a citizen of the United States, residing at Kansas City, in the county of Jackson and State of Missouri, have invented certain new and useful Improvements in Power-Transmission Attachments for Automobiles, of which the following is a specification.

My invention relates to an attachment which can be readily applied to the rear wheel of an automobile for the purpose of running pumps, churns and other light machinery, and my object is to provide a new and useful device of this character, which is simple in construction, inexpensive to manufacture, efficient in operation and can be readily applied to different kinds of wheels such, for instance, as those having wooden spokes, wire spokes, disks, etc.

In order that the invention may be fully understood, reference will now be made to the accompanying drawing, in which:

Figure 1 is a side elevation of one of the rear wheels of an automobile equipped with one form of the invention.

Fig. 2 is a fragmentary vertical section on line II—II of Fig. 1.

Fig. 3 is a broken side elevation of another form of the device applied to a rear wheel of an automobile.

Fig. 4 is a fragmentary sectional view on line IV—IV of Fig. 3.

Fig. 5 is a detail section on line V—V of Fig. 4.

A designates one of the rear wheels of an automobile, which is provided with the usual metallic rim C, hub E, spokes G, and brake drum H.

1 designates a stepped pulley employed in carrying out the form of invention disclosed by Figs. 1 and 2. Said pulley 1 has three peripheries 4, 5 and 6 of different diameters for the purpose of driving light machinery at different speeds through the intermediacy of a belt (not shown). The pulley 1 is hollow as indicated at 8 to fit freely over the wheel hub E and has a marginal flange 10 to fit against the outer sides of the spokes G. A spacing member 12 is interposed between the flange 10 and the periphery 6 to set the latter away from the spokes G far enough to prevent a belt running around said periphery 6 from contacting the adjacent side of the wheel rim C or the tire I mounted thereon.

14 designates plates adapted to fit against the inner sides of the spokes to coact with belts 16, extending through the flange 10, in holding the stepped pulley 1 firmly in position upon the wheel A. The reduced outer portion of the pulley 1 has an opening 18 to receive a bar 20 removably-held in said opening 18 by a tapered pin 22. Said bar 20 may be used for various purposes, such, for instance, as winding barb wire upon a spool or unwinding it therefrom. It may also be used to advantage in stretching wire when applying the same to fence posts.

In the other form of device disclosed by Figs. 3 to 5, inclusive, I have provided a truncated conical member $1^a$ having a threaded reduced end 2, and provided with ears 3 at its enlarged end to receive hook members $16^a$ connected by turn-buckles 17 to hook members $16^b$, adapted to engage over the rim C' of the wheel A' and thus firmly secure the conical member $1^a$ to said wheel. The conical member $1^a$ is hollow as disclosed on Fig. 4, to fit loosely over the wheel hub E'.

Pulleys $4^a$, $5^a$ and $6^a$ of different diameters are removably-mounted upon the conical member $1^a$ and prevented from turning independently thereon by a flat surface $1^b$ on the periphery of said conical member (see Fig. 5).

A nut 30 threaded upon the reduced end 2 of the conical member $1^a$ and a washer 31 hold the pulleys $4^a$, $5^a$ and $6^a$ in position upon said conical member $1^a$ which has a spacing member $12^a$ at its large end that constitutes an abutment for the pulley $6^a$ when the nut 30 is tightened up. Said spacing member $12^a$ also holds the pulley $6^a$ far enough from the outer side of the pulley A' to prevent a belt (not shown) driven by said pulley $6^a$ from contacting the adjacent side of the tire I'.

The reduced portion 2 of the conical member $1^a$ has an opening $18^a$ for the reception of a bar $20^a$, which is capable of performing the same functions as the bar 20.

By employing the fastening means disclosed on Figs. 3 and 4, the device may be secured to different kinds of wheels, such as those having wooden spokes, wire spokes, or disks, and by making the pulleys $4^a$, $5^a$ and $6^a$ separate from the conical members $1^a$, a large variety of different size pulleys may be employed.

Having thus described my invention, what I claim and desire to secure by Letters Patent, is:

In combination with a rear wheel of an automobile, a hollow truncated conical member adapted to fit freely over the wheel hub and provided at its largest diameter with a spacing member having spaced ears, a pulley removably secured to said conical member, hooks to engage the wheel rim and the ears, and means for drawing said hooks toward each other for the purpose of holding the conical member in position on the wheel.

In testimony whereof I affix my signature in the presence of two witnesses.

FRANK FOSTER.

Witnesses:
F. G. Fischer,
L. J. Fischer.